United States Patent
Hori et al.

(10) Patent No.: US 8,211,567 B2
(45) Date of Patent: Jul. 3, 2012

(54) SEALED BATTERY, AND VEHICLE EQUIPPED THEREWITH

(75) Inventors: Hideki Hori, Toyota (JP); Shigetaka Nagamatsu, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 756 days.

(21) Appl. No.: 12/276,458

(22) Filed: Nov. 24, 2008

(65) Prior Publication Data

US 2009/0142660 A1 Jun. 4, 2009

(30) Foreign Application Priority Data

Nov. 30, 2007 (JP) ................................ 2007-310071

(51) Int. Cl.
*H01M 2/02* (2006.01)
*H01M 2/08* (2006.01)

(52) U.S. Cl. ........ 429/171; 429/163; 429/164; 429/166; 429/174

(58) Field of Classification Search .................. None
See application file for complete search history.

(56) References Cited

U.S. PATENT DOCUMENTS

| | | | |
|---|---|---|---|
| 6,387,561 B1 * | 5/2002 | Nemoto et al. ................ | 429/51 |
| 2008/0003498 A1 * | 1/2008 | Yasuda et al. ................ | 429/177 |

FOREIGN PATENT DOCUMENTS

| | | |
|---|---|---|
| JP | 2000-149884 | 5/2000 |
| JP | 2006-324070 | 11/2006 |
| WO | WO 2006/123812 | 11/2006 |

OTHER PUBLICATIONS

Notification of Reason(s) for Refusal for Japanese Application No. 2007-310071, dated Dec. 11, 2009.
Office Action for Chinese Application No. 200810182196.5, dated May 6, 2010.

* cited by examiner

*Primary Examiner* — Cynthia Lee
(74) *Attorney, Agent, or Firm* — Finnegan, Henderson, Farabow, Garrett & Dunner, LLP

(57) ABSTRACT

A sealed battery includes: a battery container having in at least an end portion thereof an opening portion, and a container folded-back portion formed in a peripheral edge of the opening portion; a lid having in its outer periphery a lid folded-back portion, and being attached to the opening portion of the battery container; a junction portion in which the container folded-back portion and the lid folded-back portion are integrally joined by a double-rolled seam method; a first seal member closing a first gap between a distal end portion of the container folded-back portion clamping a distal end portion of the lid folded-back portion and an inside of a folded curve portion of the lid folded-back portion; and a second seal member closing a second gap between the distal end portion of the lid folded-back portion and an inside of a folded curve portion of the container folded-back portion.

16 Claims, 4 Drawing Sheets

SEALED BATTERY, AND VEHICLE EQUIPPED THEREWITH

INCORPORATION BY REFERENCE

The disclosure of Japanese Patent Application No. 2007-310071 filed on Nov. 30, 2007 including the specification, drawings and abstract is incorporated herein by reference in its entirety.

BACKGROUND OF THE INVENTION

1. Field of the Invention

The invention relates to a sealed battery. More particularly, the invention relates to a sealed battery in which a lid body and a battery container are joined by a double-rolled seam method, and to a vehicle equipped with the sealed battery.

2. Description of the Related Art

Lithium-ion batteries, nickel hydride batteries and other secondary batteries are gaining importance as vehicle-mounted electric power sources, or electric power sources of personal computers and portable terminals. In particular, the lithium-ion battery, which is light in weight and is able to obtain high energy density, is highly expected to be used as a vehicle-mounted high-output power source. In one example of the lithium-ion battery, an electrode body, an electrolyte solution and the like are contained in a metal-made battery container, and then a metal-made lid body is attached to an opening portion of the battery container, and is sealed thereto by joining their meeting portions by welding means such as laser welding or the like. However, the welding junction, such as the laser welding or the like, has an advantage of allowing the easy sealing with high airtightness, but is slow in the sealing speed and low in productivity. Besides, there is a need to provide means for preventing weld spatters (typically, metal dusts) that are produced at the time of laser welding from scattering into the inside of the battery. Therefore, it is required to build a sealing structure of a battery that achieves good productivity and high reliability. One sealing method for solving the foregoing problem is a method in which the lid body is joined to the battery container by using a so-called double-rolled seam method. In the double-rolled seam method, a curl of the lid body (a folded outer peripheral portion thereof), and a flange (a folded peripheral edge portion) formed on an opening end of the battery container are superposed on each other, and are rolled in together, and are bonded together by pressurizing the rolled portion from outside. If the double-rolled seam method is adopted, the junction of the lid body to the battery container can be carried out at high speed by a bending process, and there is no production of weld spatters or the like, and the prevention of entrance of foreign matter into the battery can easily be realized. Examples of the related art of this kind include Japanese Patent Application Publication No. 2000-149884 (JP-A-2000-149884).

In the foregoing kind of lithium-ion battery, it is desirable that high airtightness be maintained at the junction portion that is formed by the double-rolled seam method, even in a long-time use. That is, in the case where the battery is used under sever conditions for a long time (e.g., in a vehicle-mounted application), a gap between the lid body and the battery container tends to form in the double-rolled seam site (junction portion), and therefore there is a possibility of decline in the airtightness of the battery. In particular, in a lithium-ion battery with an insulation layer (e.g., a resin coat) formed on the lid body surface, since the insulation layer on the lid body surface and the metal forming the battery container, that is, different kinds of materials, are joined, a gap therebetween tends to form if the battery is used for a long time under severe conditions (e.g., in a place where severe vibrations can occur or where changes in temperature are severe, for example, inside a vehicle or the like).

SUMMARY OF THE INVENTION

A sealed battery in accordance with a first aspect of the invention includes: a battery container that has an opening portion in at least an end portion of the battery container, and a container folded-back portion that is formed in a peripheral edge of the opening portion; a lid body which has a lid body folded-back portion that is formed in an outer periphery of the lid body, and which is attached to the opening portion of the battery container; a junction portion in which the container folded-back portion and the lid body folded-back portion are integrally joined with each other by a double-rolled seam method; a first seal member that closes a first gap between a distal end portion of the container folded-back portion and an inside of a folded curve portion of the lid body folded-back portion, the container folded-back portion clamping a distal end portion of the lid body folded-back portion; and a second seal member that closes a second gap between the distal end portion of the lid body folded-back portion and an inside of a folded curve portion of the container folded-back portion.

According to the sealed battery of the first aspect, since the opening portion peripheral edge portion of the battery container and the outer peripheral portion of the lid body are joined with each other at the container folded-back portion and the lid body folded-back portion through a bending process by the double-rolled seam method, the junction therebetween can be carried out more efficiently in a short time than through a welding process using a laser or the like, so that the sealed battery can be provided at good productivity. Besides, at the time of junction, there is no entrance of foreign substances, such as weld spatters or the like, into the interior of the battery container, and therefore a seal (sealing) without entrance of a foreign substance can easily be realized. Moreover, in the double-rolled seam site (junction portion), since the gap between the distal end portion of the container folded-back portion and the inside of the folded curve portion of the lid body folded-back portion, and the gap between the distal end portion of the lid body folded-back portion and the inside of the folded curve portion of the container folded-back portion are firmly filled by the separate seal members, the sealing characteristic of the double-rolled seam site (junction portion) can be improved. In consequence, a highly-reliable sealed battery that can retain high airtightness for a long time can be provided.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
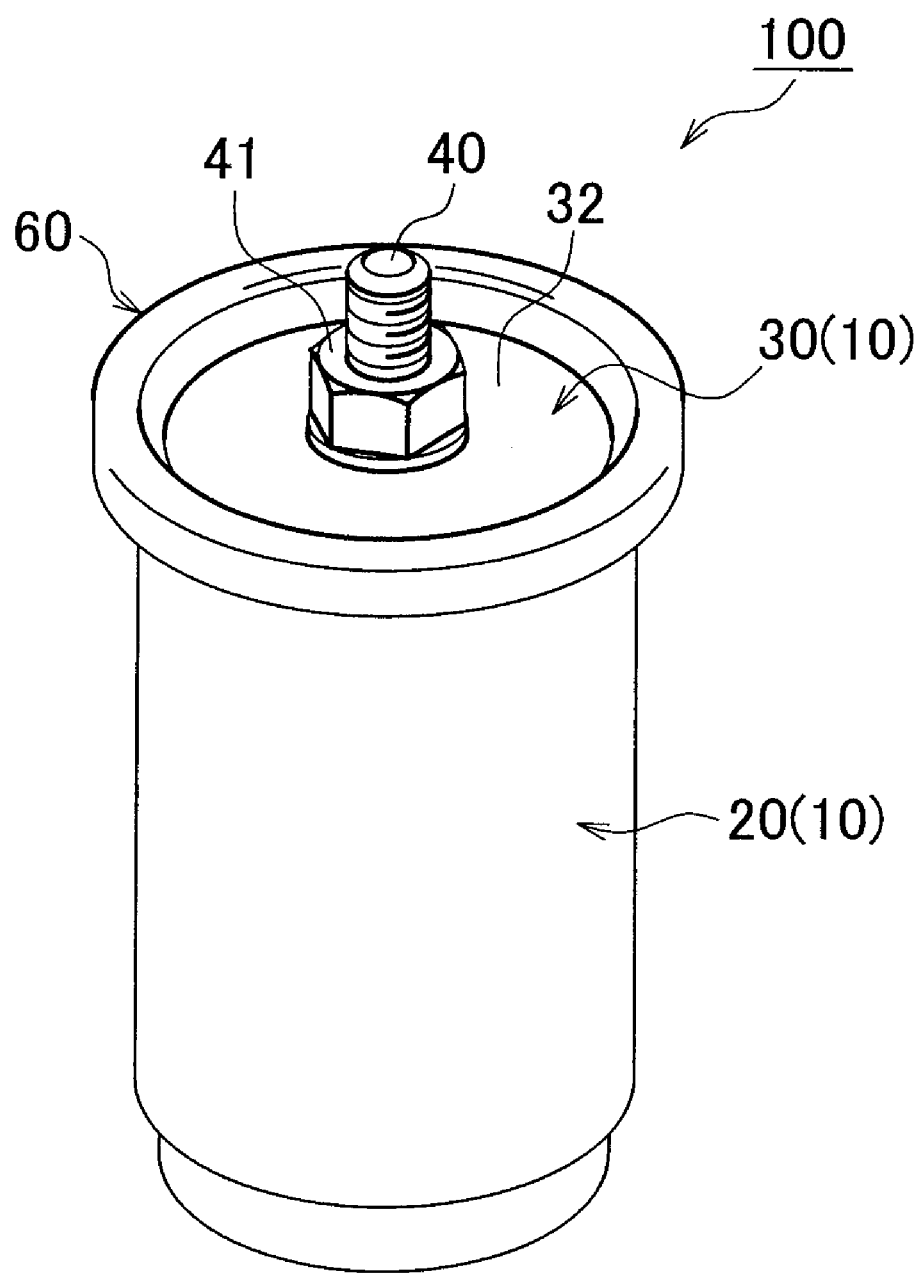
FIG. 1 is a schematic external view schematically showing an external appearance of a sealed battery in accordance with an embodiment of the invention.

Hereinafter, example embodiments of the invention will be described with reference to the drawings. In the drawings described below, the members and sites that perform the same functions are represented by the same reference characters, for easier description. In addition, a structure of the sealed battery of the invention will be described in detail with reference to, as an example, a cylindrical-shape sealed lithium-ion secondary battery 100; however, the description is not intended to limit the invention to what is described in conjunction with embodiments of the invention below. Besides, the dimensional relations (lengths, widths, thicknesses, etc.) in the drawings do not reflect the actual dimensional relation.

Figure 2:
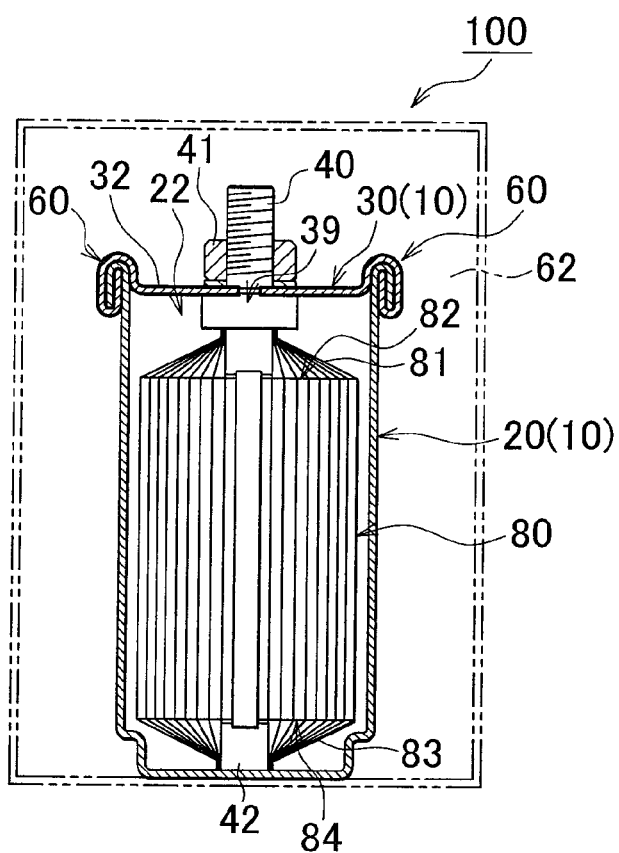
FIG. 2 is a schematic sectional view schematically showing a construction in cross section of a sealed battery in accordance with an embodiment of the invention.

With reference to FIGS. 1 and 2, the lithium-ion secondary battery 100 (hereinafter, also referred to simply as "battery") of this embodiment will be described. The battery 100 in accordance with this embodiment, similar to a related-art battery, typically includes an electrode body 80 provided with predetermined battery component members (active materials of positive and negative electrodes, current collectors of the positive and negative electrodes, separators, etc.), and a battery case 10 that contains the electrode body 80 and an appropriate electrolyte solution.

The battery case 10 is constructed of a battery container 20 and a lid body 30. The battery container 20 has such a shape (a bottomed cylinder shape in this example) that a spirally wound electrode body 80 described below can be housed in the battery container 20. The battery container 20 has at least an end thereof (an upper end in the drawing) such an opening portion 22 that the electrode body 80 can be housed via the opening portion 22. The material of the battery container 20 may be a metallic material that is light in weight and good in thermal conductivity. Examples of such a metallic material include aluminum, stainless steel, nickel-plated steel, etc. In this embodiment, the battery container 20 is an aluminum-made battery container.

The lid body 30 is attached to the opening portion 22 of the battery container 20. The lid body 30 has such a shape (a disc shape) as to be able to close the opening portion 22 of the battery container 20, and closes the opening portion 22. The material of the lid body 30 may be the same as the foregoing material of the battery container 20, but may also be different from that of the battery container 20. In this embodiment, the lid body 30 is a metal-made (aluminum-made in this example) lid body with an insulation layer 32 formed on surfaces thereof. The insulation layer 32 on the lid body surface is constructed of, for example, a metal oxide film that is made from a metal that constitutes the lid body 30. The metal oxide film 32 can easily be formed by an oxidizing process of metal surfaces of the lid body 30 (exposed metal portions of the lid body 30 that include the external and internal surfaces thereof). In this embodiment, the insulation layer 32 on the lid body surfaces is made of aluminum oxide, and is formed by an anodizing process of the aluminum surfaces of the lid body 30.

A positive electrode terminal 40 is attached to the lid body 30, and is electrically connected to the electrode body 80 that include the positive electrode and the negative electrode that are housed in the battery container 20. In this embodiment, the electrode terminal 40 is the positive electrode terminal 40 that is electrically connected to the positive electrode 82 of the electrode body 80 via a positive collector member 81. In this embodiment, the positive electrode terminal 40 is a bolt member that extends through a permeation hole 39 of the lid body 30 and protrudes out from the lid body 30. The positive electrode terminal 40 is fastened to the upper surface of the lid body 30 via a nut 41. The positive electrode terminal 40 and the lid body 30 constructed as described above are reliably insulated from each other via the insulation layer 32 provided on the lid body surfaces. A negative terminal 42 is attached to the bottom portion of the battery container 20, and is electrically connected to the negative electrode 84 of the electrode body 80 via a negative collector member 83. The negative terminal 42 may be electrically connected to the battery container 20, or may be insulated from the battery container 20. Incidentally, the attachment structures of the positive and negative terminals themselves do not characterize the invention, and can be a related-art structure without any particular restriction, and further descriptions thereof in detail are omitted.

The sealed battery 100 constructed as described above can be used with the outer surface of the battery being in contact with a cooling medium. For example, as shown in FIG. 2, the sealed battery 100 may be used in a state in which the entire battery is immersed in the cooling medium. The cooling medium 62 is, for example, an oil or the like, and may be a nonpolar oil whose polarity is small, for example, a mineral oil or the like. Examples of such a nonpolar oil include a kind of oil such as an automatic transmission oil (ATF) and the like. The use of the oil or the like as the cooling medium will greatly improve the cooling performance of the sealed battery. As a result, a sealed battery that has good battery characteristics can be provided.

Figure 3:
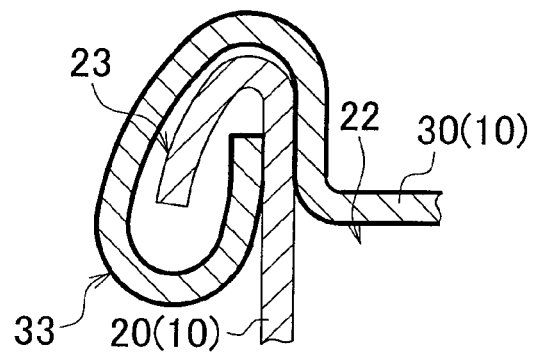
FIG. 3 is a schematic sectional view showing a portion of a double-rolled seam process for a sealed battery in accordance with an embodiment of the invention.
Figure 4:
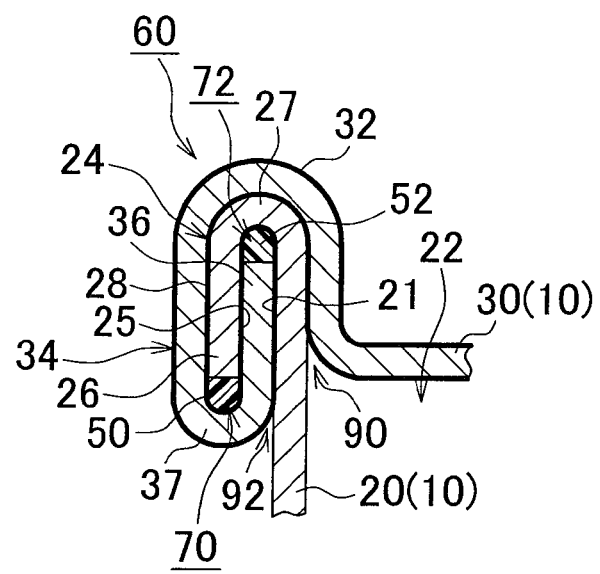
FIG. 4 is an enlarged schematic sectional view showing a double-rolled seam site of a sealed battery in accordance with an embodiment of the invention.

Next, with reference to FIGS. 3 and 4 as well, a method of attaching coining) the lid body 30 to the opening portion 22 of the battery container 20 will be described. The battery container 20 and the lid body 30 are joined with each other at an opening portion peripheral edge portion of the battery container 20 and an outer peripheral portion of the lid body 30 by a double-rolled seam method. In this embodiment, as shown in FIG. 3, a curl portion 33 is formed integrally with the outer peripheral portion of the lid body 30 by bending the outer peripheral portion outward, while a flange portion 23 is formed integrally with the opening portion peripheral edge portion of the battery container 20 by folding the peripheral edge portion toward the outer side. Then, the curl portion 33 of the lid body 30 and the flange portion 23 of the battery container 20 are superposed on each other so that the curl portion 33 is rolled into the flange portion 23, and then the superposed portions are bonded together by pressurizing the portions from outside by pressurization means, such as rollers or the like, whereby the battery container 20 and the lid body 30 are joined. The double-rolled seam site (junction portion) 60 formed in this manner has a protruded shape that is protruded outward in right-left or horizontal directions from the external surface of the battery container 20. FIG. 4 is an enlarged schematic sectional view showing a portion of a section of the protruded shape of the double-rolled seam site 60.

In the double-rolled seam site (junction portion) 60, a container folded-back portion 24 is formed in a peripheral edge of the opening portion 22 of the battery container 20.

Besides, in the outer periphery of the lid body 30, a lid body folded-back portion 34 that is integrated with the container folded-back portion 24 is formed, and a distal end portion 36 of the lid body folded-back portion 34 is clamped by the container folded-back portion 24. In this embodiment, the container folded-back portion 24 is folded back outward from the battery container 20 as a result of the flange portion 23 (FIG. 3) of the container being rolled and fastened. Besides, the lid body folded-back portion 34 is formed so as to cover an external surface 28 of the container folded-back portion 24 as a result of the curl portion 33 (FIG. 3) of the lid body being rolled and fastened. The distal end portion 36 of the lid body folded-back portion 34 is further folded back inwardly and is clamped between internal surfaces 21, 25 of the container folded-back portion 24 that form an inside of the container folded-back portion 24. Thus, the battery container 20 and the lid body 30 are joined with each other at the opening portion peripheral edge portion of the battery container 20 and the outer peripheral portion of the lid body 30 by the double-rolled seam method.

Besides, inside the double-rolled seam site (junction portion) 60 formed by the double-rolled seam method in the foregoing manner, gaps 70, 72 are formed as can be apparently understood from FIG. 4, and separate seal members 50, 52 are disposed in the gaps 70, 72. Specifically, the gap 70 is formed between a distal end portion 26 of the container folded-back portion 24 and an inside of a folded curve portion 37 of the lid body folded-back portion 34, and a first seal member 50 is disposed in the gap 70. Besides, the gap 72 is formed between a distal end portion 36 of the lid body folded-back portion 34 and an inside of a folded curve portion 27 of the container folded-back portion 24, and a second seal member 52 is disposed in the gap 72. The first seal member 50 and the second seal member 52 are press-packed into the gaps 70, 72, thereby closing the gaps 70, 72.

According to the construction of the sealed battery 100 in accordance with the embodiment, since the opening portion peripheral edge portion of the battery container 20 and the outer peripheral portion of the lid body 30 are joined with each other through a bending process by the double-rolled seam method, the junction thereof can be carried out more efficiently in a short time than in the case where the junction thereof is carried out through a welding process such as laser welding or the like. Thus, the construction of the sealed battery 100 in accordance with the embodiment makes it possible to provide sealed batteries with good productivity. Besides, at the time of junction, there is no entrance of foreign substances, such as weld spatters or the like, into the battery container 20, and therefore a seal (sealing) without entrance of a foreign substance can easily be realized. Moreover, in the double-rolled seam site (junction portion), since the gap 70 between the distal end portion 26 of the container folded-back portion 24 and the inside of the folded curve portion 37 of the lid body folded-back portion 34, and the gap 72 between the distal end portion 36 of the lid body folded-back portion 34 and the inside of the folded curve portion 27 of the container folded-back portion 24 are firmly filled by the separate seal members, the sealing characteristic of the double-rolled seam site (junction portion) can be improved. In consequence, a highly-reliable sealed battery 100 able to retain high airtightness for a long time can be provided.

Furthermore, since the insulation layer 32 is formed on the metal-made lid body surfaces in the embodiment, the positive electrode terminal 40 and the lid body 30 can easily be insulated from each other. Therefore, for example, the presence of an insulation member (e.g., a gasket) that achieve insulation between the lid body 30 and the positive electrode terminal 40 becomes unnecessary, so that the sealed battery 100 can be built easily at low cost. Besides, in the case where the battery container 20 is connected with the negative terminal 42 and constitutes an external negative electrode terminal, the battery container 20 and the lid body 30 can easily be insulated from each other by the insulation layer 32 of the lid body surfaces. Therefore, for example, a process of providing insulation on the internal and external surfaces of the battery container 20 becomes unnecessary, so that the sealed battery 100 can built easily at low cost.

With a construction in which the insulation layer 32 is formed on the lid body surface as described above, the insulation layer 32 on the lid body surfaces and the metal that constitutes the battery container 20, that is, different kinds of materials, contact each other in the double-rolled seam site (junction portion) 60, so that a gap can form therebetween in a long-time use under severe conditions. However, according to the construction of the embodiment, the construction of the junction portion by the double-rolled seam method maintains high airtightness even in a long-time use. Incidentally, the insulation layer 32 on the lid body surfaces is not limited to the metal oxide film made from a metal that constitutes the lid body 30, but may also be a resin coat that covers the lid body surfaces. Besides, although in this embodiment, the electrode terminal 40 attached to the lid body 30 is a positive electrode terminal, the electrode terminal 40 may be a negative terminal, in which case substantially the same operation and effect can be obtained.

Subsequently, materials that constitute the first and second seal members 50, 52 will be described. The first seal member 50 and the second seal member 52 may be constructed of different materials. This makes it possible to assign different functions to the two seal members 50, 52 that fill the gaps 70, 72 of the double-rolled seam site (junction portion). For example, one of the seal members in the foregoing junction portion 60 that is the nearer from the inside of the battery container 20 (in FIG. 4, the first seal member 50) is made of a material that is appropriate for the environment inside the battery, that is, is provided as a member that has a strong property against the substances inside the battery, while the seal member that is the farther from the inside of the battery container (in FIG. 4, the second seal member 52) is made of a material that is appropriate for the environment outside the battery, that is, is provided as a member that has a strong property against the substances outside the battery. In this manner, the two seal members can be provided with different seal functions.

In a specific example, of the first seal member 50 and the second seal member 52, the seal member that is the nearer of the two seal members in the junction portion 60 from the interior of the battery container 20 can be constructed of a material that is higher in electrolyte solution corrosion resistance (hereinafter, also referred to simply as "electrolyte solution resistance") (e.g., an organic material such as a resin material or the like) than a material of the other seal member. In this embodiment, the first seal member 50 is disposed in the gap 70 that is the nearer of the two gaps from the interior of the battery container 20 (the gap 70 that is the nearer of the two gaps to an entrance (an interior of the battery) to a leak flow path of the electrolyte solution or the like (in reality, a tightly closed path from the interior to the exterior of the battery) which entrance is shown by an arrow "90" in FIG. 4), and is constructed of a material that is higher in the electrolyte solution resistance (i.e., the electrolyte solution corrosion resistance and the electrolyte solution permeation resistance) than the material of the second seal member 52. Thus, by filling the gap 70 that is the nearer of the two gaps from the interior of the battery container 20 with a material that is excellent in the electrolyte solution resistance, the leakage of the electrolyte solution or the like from inside the exterior of the battery container 20 can be reliably prevented, and the sealed battery 100 can be effectively sealed.

Besides, of the first seal member 50 and the second seal member 52, the seal member that is the farther in the junction portion 60 from the interior of the battery container 20 can be constructed of a material that is higher in cooling-medium corrosion resistance (hereinafter, also referred to simply as "cooling medium resistance") than the material of the other seal member. In this embodiment, the second seal member 52 is disposed in the gap 72 that is the farther of the two gaps from the interior of the battery container 20 (i.e., the gap 72 that is the nearer to an entrance (an exterior of the battery) to an intrusion flow path of the cooling medium or the like (in reality, a tightly closed path from the exterior to the interior of the battery) which is shown by an arrow "92" in FIG. 4), and is constructed of a material that is higher in the cooling medium resistance (i.e., the cooling-medium corrosion resistance and the cooling medium permeation resistance) than the material of the other first seal member 50. In this embodiment, the cooling medium is an oil or the like, and the material that is higher in the cooling medium resistance is a material that is higher in oil corrosion resistance (hereinafter, also referred to simply as "oil resistance") (e.g., a resin or other organic material that is excellent in the oil resistance). Thus, by filling the gap 72 that is the farther of the two gaps from the interior of the battery container 20 with a material that is excellent in the cooling medium resistance, the intrusion of the cooling medium (oil in this example) from outside the battery container 20 can be reliably prevented, and the sealed battery 100 can be effectively sealed. In addition, since a battery-use seal member that is good in both the oil resistance and the electrolyte solution resistance at high level is not known, the combined use of a seal member excellent in the electrolyte solution resistance (the first seal member 50 in this example) and a seal member excellent in the oil resistance (the second seal member 52 in this example) in the junction portion 60 has a particularly great advantage.

Incidentally, the organic material whose electrolyte solution resistance is high is, for example, a material which has good moisture permeation resistance and whose seal component is not easily eluted into the electrolyte solution even at high temperatures. Examples of this material include high polymers whose main component is an olefin-based hydrocarbon. Alternatively, the material may also be asphalt, or a rubber material such as ethylene-propylene rubber (EPM, EPDM), butyl rubber, etc. The level of the electrolyte solution resistance of the material can be determined, for example, on the basis of the degree of elution of the seal component of the material with respect to a predetermined electrolyte solution. Specifically, for example, the level of the electrolyte solution resistance of the material can be determined by measuring the rate of change between the weight of each seal material prior to the immersion thereof in a predetermined electrolyte solution for a predetermined time and the weight thereof subsequent to the immersion. Smaller rates of change in the weight mean smaller amounts of elution of the seal component, and therefore indicate higher resistances to the electrolyte solution. In addition, as for other criteria, the foregoing determination can be made in a general fashion on the basis of the comparison of the moisture permeabilities of seal materials (e.g., which can be measured in a test condition according to the water vapor permeation test method for plastic films and sheets (JISK7129)), the comparison of the storage elastic moduli of resins when heated, etc.

Examples of the organic material whose oil resistance is high, in the case where the kind of oil is nonpolar oil (typically, a mineral oil), include rubber materials whose polarity is large, such as nitrile rubber (NBR), fluorocarbon rubber, etc. Besides, in the case where the kind of oil is polar oil, examples of the organic material whose oil resistance is high include organic materials whose polarity is small, such as styrene-butadiene rubber (SBR), or the like. The level (magnitude) of the oil resistance can be determined, for example, on the basis of the degree of the swelling of the organic material with respect to the family of oil that is used as a cooling medium (the swelling is a phenomenon in which oil moves into spaces between molecules of an organic material). For example, the level (magnitude) of the oil resistance of an organic material can be determined by measuring the rate of change between the weight of the organic material prior to the immersion thereof in a predetermined oil or the like for a predetermined time and the weight thereof subsequent to the immersion. The smaller the rate of change of the weight of an organic material is, it is indicated that the organic material is the less apt to swell, and therefore is the higher in the oil resistance. In addition, as for other criteria, the level (magnitude) of the resistance of an organic material to oil may be determined in a general fashion on the basis of the decline in the strength or the degree of contraction, etc., occurring in the case where the organic material is immersed in the oil.

Incidentally, in the double-rolled seam process shown in FIGS. 3 and 4, the material that constitutes the first seal member 50 is applied beforehand at a predetermined position inside the curl portion 33, and is arranged so that when the curl portion 33 and the flange portion 23 are processed for the double-rolled seam, the material is press-packed into the desired gap 70. At the time of press-packing, the material constituting the first seal member 50 may also be disposed at a boundary that communicates between the gap 70 and the interior of the battery container 20 (a boundary between the external surface 28 of the container folded-back portion 24 and the lid body 30), in addition to the predetermined gap 70. Besides, the material constituting the second seal member 52 is applied beforehand at a predetermined position (different from the position of the first seal member 50) inside the curl portion 33, and is arranged so that when the curl portion 33 and the flange portion 23 are processed for the double-rolled seam, the material is press-packed into the desired gap 72. At the time of press-packing, the material constituting the second seal member 52 may also be disposed at a boundary that communicates between the gap 72 and the exterior of the battery container 20 (a boundary between the internal surface 21 of the container folded-back portion 24 and the distal end portion 36 of the lid body 30), in addition to the predetermined gap 72.

Figure 5:
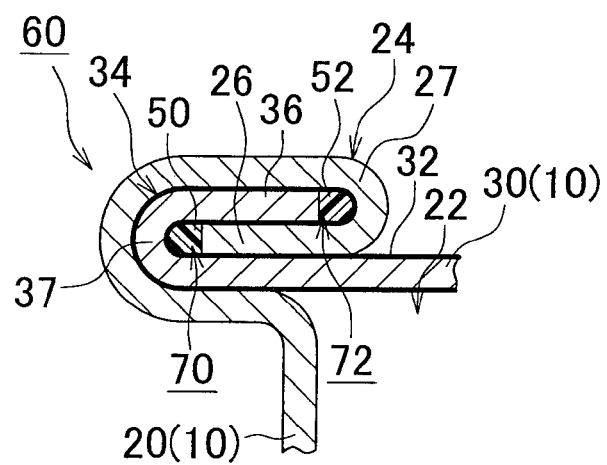
FIG. 5 is a schematic sectional view showing a modification of the sealed battery of the embodiment of the invention.

FIG. 5 shows a modification of the sealed battery 100 of the foregoing embodiment. The modification shown in FIG. 5 is different from the foregoing embodiment in that in a double-rolled seam site 60, a container folded-back portion 24 is formed so as to cover an external surface of a lid body folded-back portion 34. Specifically, the double-rolled seam site (junction portion) 60 is formed by press-bonding the curl portion of the battery container 20 and the flange portion of the lid body 30 so that they are rolled in together. As a result, the double-rolled seam site 60 has a protruded shape in which the double-rolled seam site 60 is protruded from an external surface of the lid body 30 toward an outer side in a vertical direction. As shown in FIG. 5, the container folded-back portion 24 is formed in a peripheral edge of an opening portion 22 of the battery container 20. Besides, a lid body folded-back portion 34 that is integrated with the container folded-back portion 24 is formed in an outer periphery of the lid body 30. A distal end portion 36 of the lid body folded-back portion 34 is clamped by the container folded-back portion 24. In this modification, the lid body folded-back portion 34 is folded back outward from the lid body 30. Besides, the container folded-back portion 24 is formed so as to cover the external surface of the lid body folded-back portion 34. A distal end portion 26 of the container folded-back portion 24 is further folded back inwardly, and is clamped between internal surfaces of the lid body folded-back portion 34 that form the inside of the lid body folded-back portion 34. Besides, as in the forgoing embodiment, a gap 70 is formed between the distal end portion 26 of the container folded-back portion 24 and the inside of the folded curve portion 37 of the lid body folded-back portion 34, and a first seal member 50 is disposed in the gap 70. Besides, a gap 72 is formed between the distal end portion 36 of the lid body folded-back portion 34 and the inside of the folded curve portion 27 of the container folded-back portion 24, and a second seal member 52 is disposed in the gap 72. In this modification, the first seal member 50 is disposed in the gap 70 that is the farther of the two gaps from the interior of the battery container 20. Therefore, the first seal member 50 may be constructed of a material (e.g., an oil-resistant organic material as mentioned above) that is higher in the cooling medium resistance (the cooling-medium corrosion resistance and the cooling medium permeation resistance) than the material of the second seal member 52. Besides, the second seal member 52 is dispose in the gap 72 that is the nearer of the two gaps from the interior of the battery container 20. Therefore, the second seal member 52 may be constructed of a material (e.g., an organic material as mentioned above) that is higher in the electrolyte solution resistance (i.e., the electrolyte solution corrosion resistance and the electrolyte solution permeation resistance) than the material of the first seal member 50.

Hereinafter, with reference to FIG. 2, component materials that constitute the sealed battery 100 will be described. The electrode body 80 is a spirally wound electrode body, and is fabricated similarly to the electrode body of a common lithium-ion battery, that is, by firstly superposing a positive electrode sheet and a negative electrode sheet together with two separator sheets, and then spirally winding the positive electrode sheet and the negative electrode sheet. In addition, prior to the winding process, the positive electrode active material layer of the positive electrode sheet is removed to expose the positive electrode current collector, and the positive collector member 81 is provided on the positive electrode current collector exposed portion (the positive electrode of the electrode body) 82. Besides, the negative electrode active material layer of the negative electrode sheet is removed to expose the negative electrode current collector, and the negative collector member 83 is provided on the negative electrode current collector exposed portion (the negative electrode of the electrode body) 84. In this embodiment, the positive collector member 81 and the negative collector member 83 are each a foil-like current collector tab, and are separately bundled and electrically connected to the positive electrode terminal 40 and the negative terminal 42, respectively. The positive electrode sheet can be formed by providing a lithium-ion battery positive electrode active material layer on an elongated positive electrode current collector. As for the positive electrode current collector, an aluminum foil (in this embodiment) and other metal foils suitable for the positive electrode can be used. As for the positive electrode active material, one or more species of the materials used in the related-art lithium-ion batteries can be used without any particular limitation. Further examples thereof include $LiMn_2O_4$, $LiCoO_2$, $LiNiO_2$, etc. On the other hand, the negative electrode sheet can be formed by providing a lithium-ion battery negative electrode active material layer on an elongated negative electrode current collector. As for the negative electrode current collector, a copper foil (in this embodiment) and other metal foils suitable for the negative electrode can be used. As for the negative electrode active material, one or more species of the materials used in the related-art lithium-ion battery can be used without any particular limitation. Further examples thereof include carbon-based materials, such as graphite carbon, amorphous carbon, etc., lithium-containing transition metal oxides, transition metal nitrides, etc. Besides, another examples of the separator sheet used between the positive and negative electrodes sheets include separator sheets that are constructed of a porous olefin-based resin. In the case where a solid electrolyte or a gelatinous electrolyte is used as an electrolyte, it can happen that the separators are not needed (i.e., in this case, the electrolyte itself is able to function as separators). In addition, the shape of the battery container 20 that houses the spirally wound electrode body 80 is not limited to a cylindrical shape, but may also be, for example, a box shape. In the case where a box-shape battery container is used, a flat-shape spirally wound electrode body fabricated by pressing and flattening or deforming the spirally wound body from side directions can be used.

Examples of the electrolyte solution housed together with the spirally wound electrode body 80 within the battery container 20 include a nonaqueous electrolyte solution obtained by dissolving an electrolyte in a nonaqueous solvent. As for the nonaqueous solvent constituting the electrolyte solution, one or more species selected from the group consisting of ethylene carbonate, propylene carbonate, dimethyl carbonate (DMC), diethyl carbonate, ethyl methyl carbonate (EMC), 1,2-dimethoxyethane, 1,2-diethoxyethane, tetrahydrofuran, 1,3-dioxolane, etc. can be used. As for an electrolyte (supporting electrolyte) that constitutes the electrolyte solution, one or more species selected from various lithium salts that contains fluorine as a component element can be used. For example, one or more species selected from the group consisting of $LiPF_6$, $LiBF_4$, $LiAsF_6$, $LiCF_3SO_3$, $LiC_4F_9SO_3$, $LiN(CF_3SO_2)_2$, $LiC(CF_3SO_2)_3$, etc. can be used.

Figure 6:
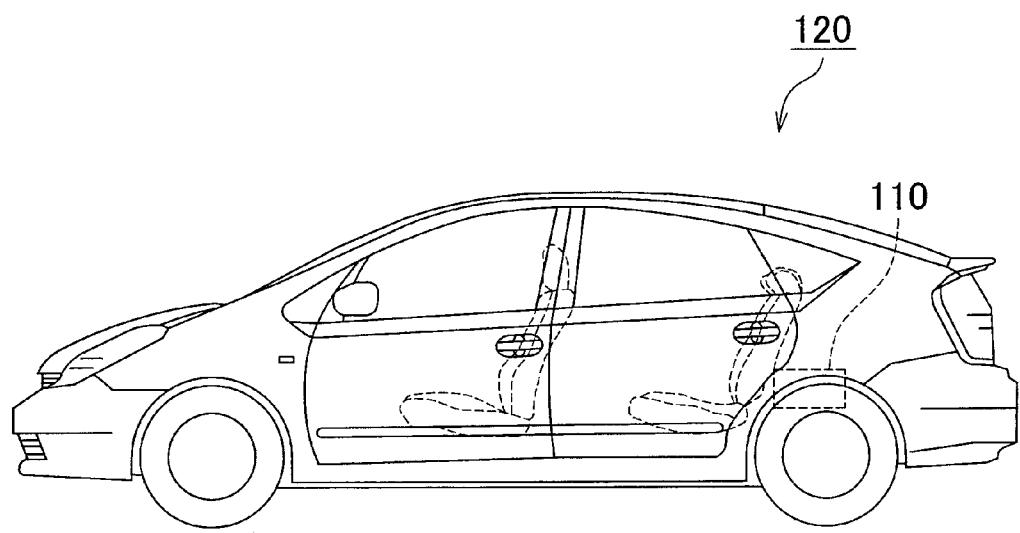
FIG. 6 is a side view schematically showing a vehicle (motor vehicle) equipped with a sealed battery in accordance with an embodiment of the invention.

The sealed battery in accordance with this embodiment can be used particularly as an electric power source for a motor (electric motor) that is mounted in a vehicle such as a motor vehicle or the like. That is, as shown in FIG. 6, a battery assembly (battery pack) 110 can be built by aligning batteries in accordance with the embodiment as unit cells and constraining the unit cells in the aligning direction, and a vehicle 120 equipped with the battery assembly 110 as an electric power source (typically, a motor vehicle and, more particularly, a motor vehicle equipped with an electric motor as a drive source, such as a hybrid vehicle, an electric vehicle, a fuel cell vehicle, etc.) can be provided. In the vehicle-mounted sealed battery provided by the invention, high air-tightness can be maintained at the double-rolled seam site (junction portion) even if the battery is used for a long time under severe conditions (e.g., in a place where severe vibrations can occur or where changes in temperature are severe, for example, inside a vehicle or the like).

While example embodiments of the invention have been described, the foregoing descriptions are not what limit the invention, but it should be apparent that various other changes and modifications are possible. For example, the kind of the sealed battery is not limited to the foregoing lithium-ion battery, but may also be various other kinds of batteries that are different in terms of electrode body component materials and electrolytes, for example, lithium secondary batteries whose negative electrode is made of lithium metal or a lithium alloy, nickel hydride batteries, nickel-cadmium batteries, or electric double layer capacitors. The cooling medium may be a gas (e.g., air), or may also be an aqueous solution containing a water-soluble polymer that is high in specific heat.

What is claimed is:

1. A sealed battery comprising:
   a battery container that has an opening portion in at least an end portion of the battery container, and a container folded-back portion that is formed in a peripheral edge of the opening portion;
   a lid body which has a lid body folded-back portion that is formed in an outer periphery of the lid body, and which is attached to the opening portion of the battery container;
   a junction portion in which the container folded-back portion of the battery container and the lid body folded-back portion of the lid body are integrally joined with each other by a double-rolled seam method;
   a first seal member that closes a first gap between a distal end portion of the container folded-back portion and an inside of a folded curve portion of the lid body folded-back portion, the container folded-back portion clamping a distal end portion of the lid body folded-back portion; and
   a second seal member that closes a second gap between the distal end portion of the lid body folded-back portion and an inside of a folded curve portion of the container folded-back portion;
   wherein the first seal member is separate from the second seal member.

2. The sealed battery according to claim 1, wherein the first seal member and the second seal member are constructed of materials that are different from each other.

3. The sealed battery according to claim 2, wherein one seal member of the first seal member and the second seal member in the junction portion, which is nearer from an interior of the battery container than another seal member of the first seal member and the second seal member, includes an electrolyte solution corrosion resistance material, the electrolyte solution corrosion resistance material of the one seal member being more resistant to electrolyte solution corrosion than a material of the other seal member.

4. The sealed battery according to claim 3, wherein the electrolyte solution corrosion resistance material of the one seal member is a material which has moisture permeation resistance, and whose seal component is less easily eluted into an electrolyte solution even at high temperature.

5. The sealed battery according to claim 2, wherein the sealed battery is used, with an external surface of the battery being in contact with a cooling medium, and wherein one seal member of the first seal member and the second seal member in the junction portion, which is farther from an interior of the battery container than another seal member of the first seal member and the second seal member, includes a cooling-medium corrosion resistance material, the cooling-medium corrosion resistance material of the one seal member being more resistant to cooling-medium corrosion than a material of the other seal member.

6. The sealed battery according to claim 5, wherein the cooling medium includes oil, and the cooling-medium corrosion resistance material of the one seal member is a material that is more resistant to oil corrosion than the material of the other seal member.

7. The sealed battery according to claim 5, wherein the cooling medium is a gas.

8. The sealed battery according to claim 5, wherein the cooling medium is an aqueous solution containing a water-soluble polymer that is high in specific heat.

9. The sealed battery according to claim 1, wherein the lid body is a metal-made lid body whose surface has an insulation layer, and an electrode terminal is attached to the lid body, and is electrically connected to an electrode body that includes a positive electrode and a negative electrode that are housed in the battery container.

10. The sealed battery according to claim 9, wherein the insulation layer is constructed of a metal oxide film made from a metal that constitutes the lid body.

11. The sealed battery according to claim 9, wherein the insulation layer is a resin coat that covers a surface of the lid body.

12. The sealed battery according to claim 1, wherein the first seal member is disposed at a boundary between the container folded-back portion and the lid body folded-back portion.

13. The sealed battery according to claim 1, wherein the second seal member is disposed at a boundary between the container folded-back portion and the lid body folded-back portion.

14. A vehicle comprising the sealed battery according to any one of claims 1 to 13.

15. The sealed battery according to claim 1, wherein in the junction portion, a surface of the lid body folded-back portion is in direct contact with a surface of the container folded-back portion.

16. A sealed battery comprising:
   a battery container that has an opening portion in at least an end portion of the battery container, and a container folded-back portion that is formed in a peripheral edge of the opening portion;
   a lid body which has a lid body folded-back portion that is formed in an outer periphery of the lid body, and which is attached to the opening portion of the battery container;
   a junction portion in which the container folded-back portion of the battery container and the lid body folded-back portion of the lid body are integrally joined with each other by a double-rolled seam method;
   a first seal member that closes a first gap between a distal end portion of the container folded-back portion and an inside of a folded curve portion of the lid body folded-back portion, the container folded-back portion clamping a distal end portion of the lid body folded-back portion; and
   a second seal member that closes a second gap between the distal end portion of the lid body folded-back portion and an inside of a folded curve portion of the container folded-back portion;
   wherein the first seal member and the second seal member are constructed of materials that are different from each other.

* * * * *